Figure 1:
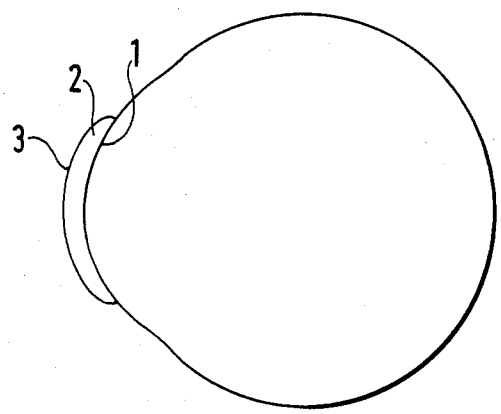

United States Patent [19]

Freeman

[11] Patent Number: 4,637,697
[45] Date of Patent: Jan. 20, 1987

[54] MULTIFOCAL CONTACT LENSES UTILIZING DIFFRACTION AND REFRACTION

[75] Inventor: Michael H. Freeman, Wales, Wales

[73] Assignee: Pilkington P.E. Limited, United Kingdom

[21] Appl. No.: 543,257

[22] Filed: Oct. 19, 1983

Related U.S. Application Data

[63] Continuation-in-part of Ser. No. 533,993, Sep. 20, 1983, and a continuation-in-part of Ser. No. 368,362, Apr. 14, 1982.

[30] Foreign Application Priority Data

Oct. 27, 1982 [GB] United Kingdom ............... 8230621

[51] Int. Cl.$^4$ ............ G02C 7/04; G02C 7/06; G02B 3/08; G02B 27/44
[52] U.S. Cl. ................ 351/161; 350/162.16; 350/162.22; 350/452; 351/177
[58] Field of Search ........... 350/162.22, 452, 162.16; 351/160 R, 160 H, 161, 162, 177

[56] References Cited

U.S. PATENT DOCUMENTS

| | | | |
|---|---|---|---|
| 3,004,470 | 10/1961 | Ruhle | 350/452 |
| 3,339,997 | 9/1983 | Wesley | 351/161 |
| 3,794,414 | 2/1974 | Wesley | 351/161 |
| 4,073,579 | 2/1978 | Deeg et al. | 351/169 |
| 4,162,122 | 7/1979 | Cohen | 351/161 |
| 4,206,518 | 6/1980 | Jardon et al. | 623/6 |
| 4,210,391 | 7/1980 | Cohen | 351/161 |
| 4,338,005 | 7/1982 | Cohen | 351/161 |
| 4,340,283 | 7/1982 | Cohen | 351/161 |
| 4,377,329 | 3/1983 | Poler | 351/160 R |
| 4,402,579 | 9/1983 | Poler | 351/160 R |

FOREIGN PATENT DOCUMENTS 0064812 5/1982 European Pat. Off.
2074870 10/1971 France.

OTHER PUBLICATIONS

"The Leiske Physioflex Style 10 Anterior Chamber Lens", Surgide, Jan. 4/1981, No. 3-13.

Primary Examiner—John K. Corbin
Assistant Examiner—Scott J. Sugarman
Attorney, Agent, or Firm—F. Eugene Davis, IV; Mark P. Stone

[57] ABSTRACT

A bifocal contact lens has diffractive power added to the basic refractive power provided by the material of the lens and the basic curvature of its front and rear surfaces. The diffractive power arises from concentric zones, each providing an asymmetric retardation of light across the zone width to direct design wavelength light predominantly into a required order and sign of diffraction, while other wavelength light is predominantly transmitted at zero order. Design wavelength light from an object at one distance can then be focused by way of diffraction of that order and sign, and other wavelength light from an object at another distance can be focused by way of zero order transmission. Preferably the zones are defined, and the asymmetric retardation provided, by a rear surface contour having steps but which approximates to the required basic curvature.

22 Claims, 11 Drawing Figures

MULTIFOCAL CONTACT LENSES UTILIZING DIFFRACTION AND REFRACTION

RELATED APPLICATIONS

This application is a continuation-in-part of my earlier application Ser. No. 368,362 filed Apr. 14, 1982 entitled Artificial Eye Lens and of my application Ser. No. 533,993 filed Sept. 20, 1983 entitled Improvements in or Relating to Ophthalmic Lenses.

This invention concerns improvements in or relating to contact lenses and relates more particularly to bifocal contact lenses.

The rear surface of a well fitting contact lens has a radius of curvature near that of the cornea. The front surface of the contact lens has a radius of curvature which is determined by the refractive correction required by the wearer. In the case of a bifocal contact lens there is the requirement for additional positive power to replace the failing accommodation of the presbyopic wearer. If this additional power is effected by a change in curvature which, in the case of the rear surface, would generally involve an increase in the radius of curvature, this renders the surface a less good fit on the cornea. It has, however, been proposed in U.S. patent application Ser. No. 368,362 that diffractive power, e.g. provided by a hologram, should be added to the basic refractive power of the contact lens whereby no change in the basic surface curvature is needed.

The present invention also concerns a contact lens which uses the diffraction of light to provide some or all of its optical power. This diffractive power is usually along or nearly along the axis of the contact lens and therefore along the axis of the eye wearing the contact lens. Holograms which provide on-axis power are called in-line or axial holograms. Such holograms have a regular pattern of rings or zones whose centres lie on the axis. Depending largely on the optical effect of each zone, diffractive optical devices with concentric zones have received the names Fresnel Zone Plates (FZPs), Phase Zone Plates, Kinoform Lenses, Thin Film Lenses, Holographic Optical Elements (HOEs); generally the name relates to the method of manufacture. The requirement for diffractive power is the amplitude addition of component light waves having phase differences equivalent to one wavelength to give a new continuous wavefront having a different curvature from the incident wavefront from which the component light waves were generated. The optical term coherence is used to define the conditions under which this can occur. The component light waves are said to be coherent when the phase difference between adjacent zones shows a simple mathematical relationship across the whole aperture of the device.

The Fresnel Zone Plate should not be confused with the Fresnel Lens which has no diffractive power. The Fresnel Lens has facetted zones which have random equivalent phase differences between them. This is due largely to having actual phase differences which are many (e.g. around 100) wavelengths so that the equivalent residual phase difference may be any value between 0 and $2\pi$ because of random inaccuracies in the manufacturing method. Any amplitude addition across the lens is insignificant and no useable diffractive power is generated although there is diffractive scattering. The power of a Fresnel Lens is therefore determined solely by refraction at each of the facets of the lens, each of which forms an image of the object. With correct design these images are formed in the same place and the final intensity of the ultimate image is found by adding the intensities of the component images. The diffractive scattering at each facet severely limits the resolution even when all the images are perfectly superimposed.

In the case of optical devices with diffractive power, such as Kinoform Lenses, the diffractive effects are used to form the image and refraction is secondary. The phase difference between each zone is carefully controlled to an accuracy equivalent to about one tenth the wavelength of light. This fundamental requirement for accuracy in the sub-micron region has generally restricted fabrication methods to those using optics and photo-sensitive materials such as holography, scanning Fabry-Perot interferometers and photo-resist material, master drawings with photographic materials and photo-lithographic methods, and thin films which can be etched through photographically generated masks. Such methods have also been used to make diffraction gratings which have proved considerably superior to earlier diffraction gratings made by ruling grooves with a diamond or the like on metal substrates.

According to the present invention there is provided a bifocal contact lens having diffractive power, comprising a plurality of concentric zones arranged so as to cause diffraction of light transmitted through the lens, each zone providing an asymmetric retardation of light across the zone width in a manner which directs light of a design wavelength predominantly into a required order and sign of diffraction at the expense of transmission at zero order and at the expense of transmission at the opposite sign of said required order of diffraction, while light of another wavelength displaced from said design wavelength is predominantly transmitted at zero order in preference to said required order and sign of diffraction, whereby light of said design wavelength from an object at one distance can be focussed by way of said required order and sign of diffraction and light of said other wavelength from an object at another distance can be focussed by way of zero order transmission.

Conveniently said required order of diffraction may be first order diffraction.

Said concentric zones may be defined by surface discontinuities and/or refractive index changes. Said asymmetric retardation across each zone width may be provided by thickness variation or refractive index variation or a combination of both. Preferably the zones are defined, and the asymmetric retardation is provided, by the surface contour of the lens, and preferably the rear surface contour. Thus, in particular, the zones may be defined by steps in the lens surface. The asymmetric retardation may be provided by a stepped surface contour, for example having three, but possibly having more, stepped areas, across each zone, or may alternatively be provided by a smooth curve across the zone, the arrangement in either case being asymmetric across the zone width.

The diffractive power of the lens may be additional to refractive power provided by the material of the lens and the basic curvature of its front and rear surfaces. The above mentioned surface contour can be superimposed on the base curve in a manner which effectively retains the basic curvature. Notably, a curvature of one radius may be made discontinuous by step sizes appropriate for approximation to a curvature of different radius. Where there are stepped areas across each zone, these stepped areas may each have a radius of curvature the same as that of the base curve. Where there is a smooth curve across each zone it may have a radius of curvature which differs from that of the base curve but the step size at the zone edge can be such as to give general conformation of the surface to the basic curvature.

The lens may be manufactured using a technique as mentioned previously which is used for the fabrication of optical devices with diffractive power. Preferably, however, the lens is manufactured using material cutting technology which leaves an optically good surface, and in particular by a computer-controlled lathe (as have been developed for making aspheric lenses in plastics materials).

Figure 2:
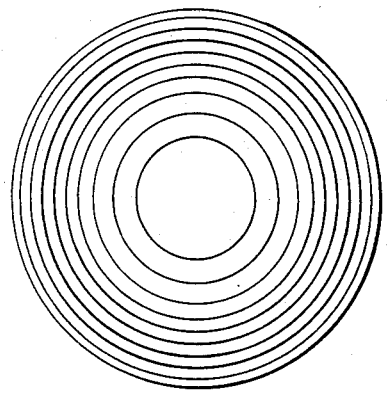
Figure 3:
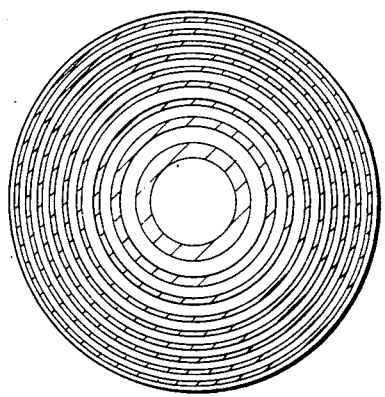
Figure 4:
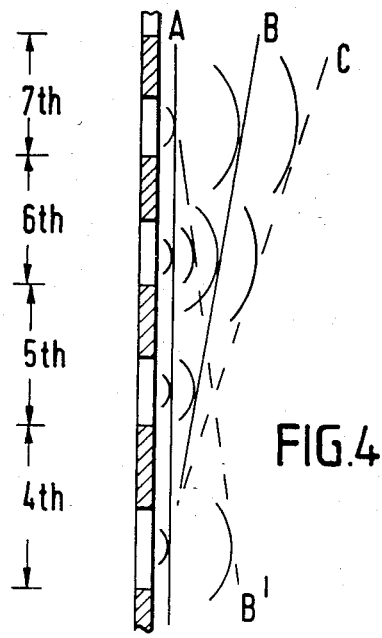
Figure 5:
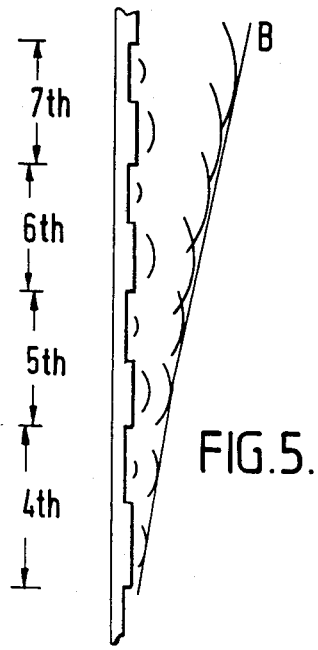
Figure 6:
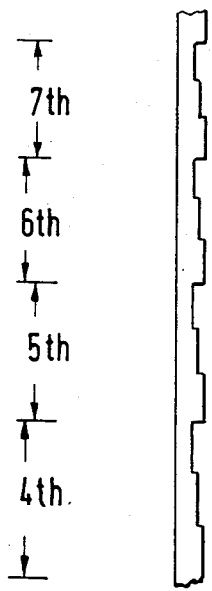
Figure 7:
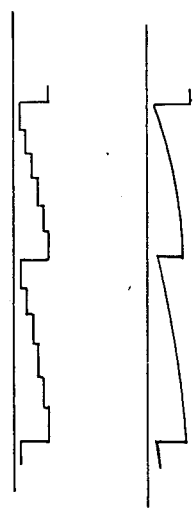
Figure 8:
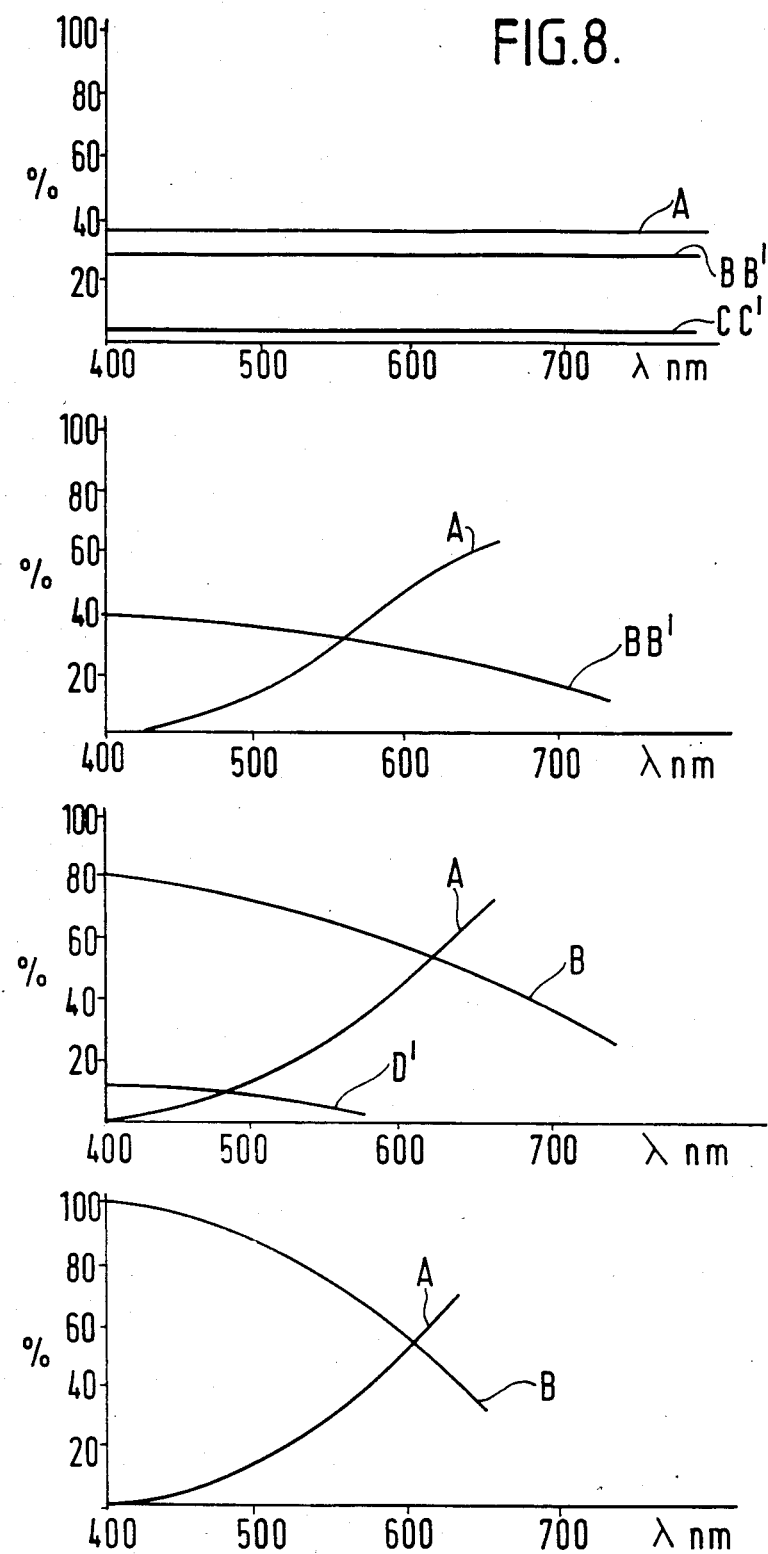
Figure 9:
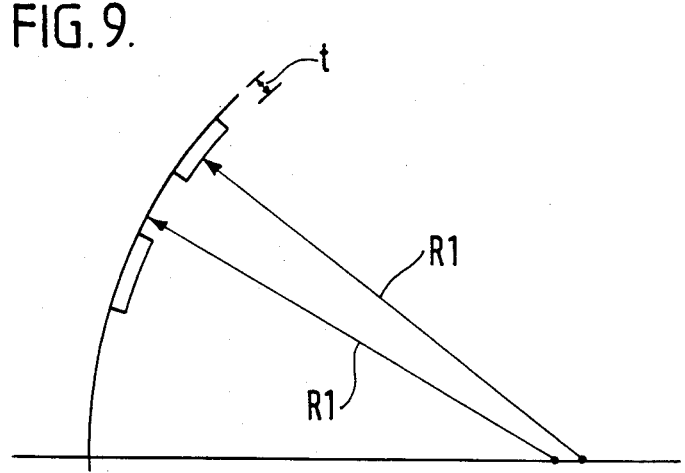
Figure 9:
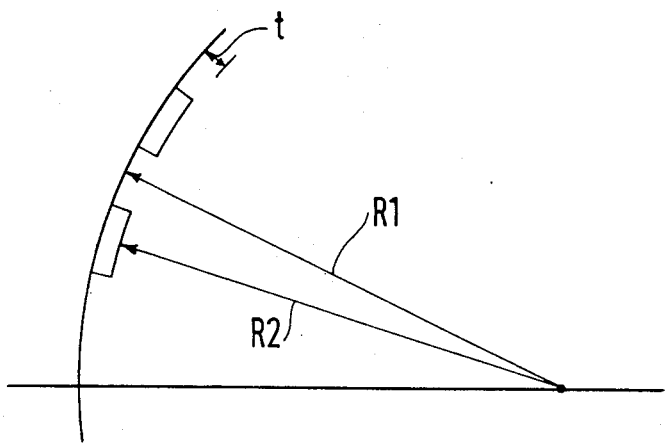
Figure 10:
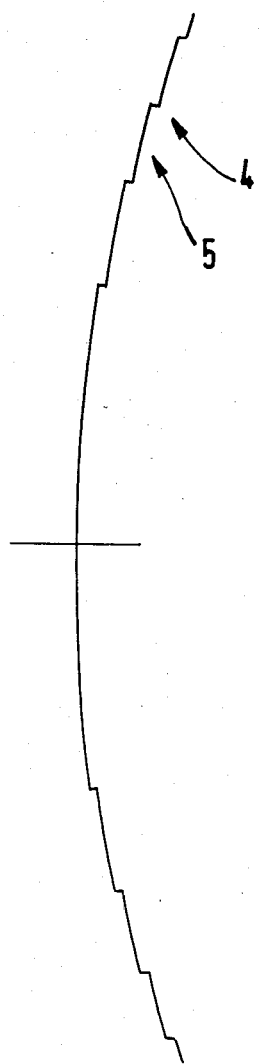
Figure 11:
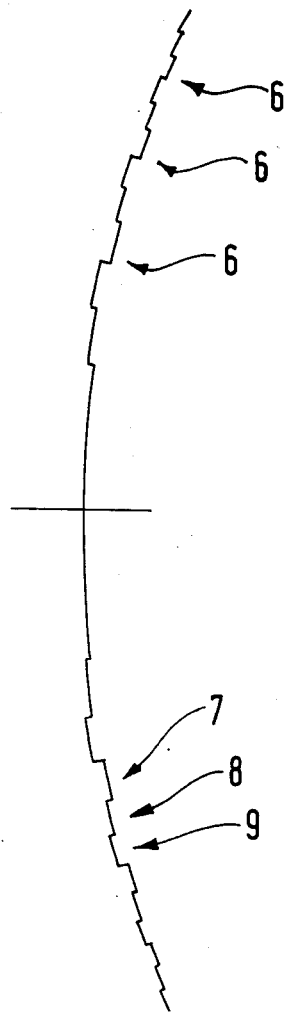

Further aspects of the invention will be apparent from the following explanation and description which is, and in which the numerical values are given, by way of illustration and example. In order that it may be better understood, reference is made to the accompanying drawings, in which:

FIG. 1 is a schematic representation of an eye wearing a contact lens,

FIGS. 2 and 3 schematically represent concentric zones of a diffractive optical element, FIGS. 4, 5 and 6 are schematic cross sections through part of respective diffractive optical elements, FIG. 7 illustrates the transition from a stepped contour to a smooth curve contour in the design of a diffractive optical element, FIG. 8 is a graphical representation of light transmission through respective diffractive optical elements, FIG. 9 illustrates the effect of different thickness portions on a diffractive optical element, FIG. 10 is a schematic axial cross-sectional representation through a surface of one embodiment of bifocal contact lens in accordance with the invention, and FIG. 11 is a schematic axial cross-sectional representation through a surface of a second embodiment of bifocal contact lens in accordance with the invention.

Referring initially to FIG. 1, a typical adult human eye cornea has a radius of curvature of 8 mm. Accordingly the rear surface 1 of a well fitting contact lens 2 has a radius of curvature near this value. The front surface 3 of the contact lens has a radius of curvature which can vary from 6 mm to 12 mm depending on the refractive correction required by the wearer, which may be from +20 Dioptres to −20 Dioptres. The lens 2 can thus have refractive power from the material (refractive index) of the lens and the curvature of its front and rear surfaces 3 and 1. In the case of a bifocal contact lens additional positive power is required to replace the failing accommodation of the presbyoptic wearer. This may vary from 0.5 Dioptres to 3 or even 4 Dioptres depending on the needs of the wearer and the amount of residual accommodation still available; a value of 2 Dioptres can be considered as illustrative for general purposes. The additional power can be provided by diffraction, and in particular by providing the lens 2 with a plurality or series of concentric zones arranged to diffract light transmitted through the lens in the manner of a phase zone plate.

Consideration will be given to the central 4 mm diameter area of the contact lens because the natural eye pupil is hardly greater than this value under illumination which is sufficient for close vision, and particularly for reading. A diffractive optical element requires about 10 zones over this central 4 mm diameter area for a local length of 500 mm. Such zones are shown in FIG. 2 in which each circle defines the outer limit of one zone and the inner limit of the next, the zone widths (i.e. radius difference between successive circles) decreasing outwardly so as to provide zones of equal area. If each of these zones is treated to affect in the same way the light passing through them, a proportion of this light will be focussed at 250 mm, 125 mm etc., as well as at −500 mm, −250 mm and −125 mm etc. These other foci arise from different orders of diffraction equivalent to those occurring with diffraction gratings.

The simplest possible treatment of the zones is to make one-half of each zone opaque. FIG. 3 shows the outer half (area) of each zone made opaque, and FIG. 4 shows an enlarged cross-section through the zone plate from the 4th zone to the 7th. Only the inner half of each zone (the lower half in FIG. 4) is transparent to light. The action of the light passing through these half zones can be summarised to that of a series of small wavelets emerging from the mid point of each transparent half-zone. These wavelets themselves summarise to a continuous wavefront. The simplest of these is indicated by A in FIG. 4 (and represents zero order transmission). Other wavefronts can be formed by connecting across the zones but with one or more waves slip between each. The important one of these is that marked B (representing positive first order diffraction) as this gives the 500 mm focal length required for the reading power add. As can be seen in the FIG. 4 other wavefronts can be formed and these lead to the other foci; C (representing positive second order diffraction) gives the +250 mm focus and B' (representing negative first order diffraction) gives the −500 mm focus. It turns out that with the equi-transparent and opaque zone plate the energy going into the C image at 250 mm is zero. It may be noted that many textbooks divide a zone plate into half-period zones and give a mathematical treatment which applies only to the equi-transparent and opaque condition. For the present more general purpose $R_m$ is defined as the outer radius of the $m^{th}$ full-period zone. This gives a focal length ($f_1$) for the B wavefront specified by the equation:

$$f_1 = \tfrac{1}{2}\left(\frac{(R_m)^2}{m\lambda}\right);$$

the focal length ($f_1'$) for the B' wavefront is given by:

$$f_1' = \tfrac{1}{2}\left(\frac{(R_m)^2}{-m\lambda}\right);$$

the focal length ($f_2$) for the C wavefront is given by:

$$f_2 = \tfrac{1}{2}\left(\frac{(R_m)^2}{2m\lambda}\right);$$

the focal length ($f_2'$) for the C' wavefront (representing negative second order diffraction) is given by:

$$f_2' = \tfrac{1}{2}\left(\frac{(R_m)^2}{-2m\lambda}\right);$$

the focal length ($f_3$) of the D wavefront (representative of positive third order diffraction) is given by:

$$f_3 = \frac{1}{2}\left(\frac{(Rm)^2}{3m\lambda}\right)$$

and so on, $\lambda$ being the light wavelength.

The treatment of the light within each zone controls the amount of light going into each focus. In the case of the equi-transparent/opaque zone plate the values are:

| | | | | | Order | | | | | |
|---|---|---|---|---|---|---|---|---|---|---|
| −5 | −4 | −3 | −2 | −1 | 0 | +1 | +2 | +3 | +4 | +5 |
| F' | E' | D' | C' | B' | A | B | C | D | E | F |
| 1% | 0% | 2% | 0% | 29% | 35% | 29% | 0% | 2% | 0% | 1% |

This therefore produces relatively strong images by the zero order transmission (A) and both the positive and negative first order diffraction (B and B') wavefronts, as well as weaker images by the positive and negative third and fifth order diffraction (D, D', F, F') wavefronts. The alternate clear and opaque treatment of the half zone areas also means that 50% of the incident light is absorbed.

Consider now replacing the opaque areas with areas which transmit the light but delay by an amount equal to one-half wavelength the wavelets now allowed through. This can be accomplished for example by overlaying these areas with a very thin layer of some transmitting optical material using the techniques of thin film deposition. The light travels more slowly through this material than through air in the adjacent area. The action in each individual area can again be summarised in terms of wavelets emerging from a central point and FIG. 5 is a cross-sectional illustration similar to FIG. 4. However, the raised areas mean that the (zero order transmission) wavefront A of FIG. 4 is now not allowed to form (because the phase delayed wavelets are interposed) and there is no energy going into this image. As can be seen in the following table most light goes into the positive and negative first order diffraction images B and B':

| | | | | | Order | | | | | |
|---|---|---|---|---|---|---|---|---|---|---|
| −5 | −4 | −3 | −2 | −1 | 0 | +1 | +2 | +3 | +4 | +5 |
| F' | E' | D' | C' | B' | A | B | C | D | E | F |
| 1.6% | 0% | 4.5% | 0% | 40% | 0% | 40% | 0% | 4.5% | 0% | 1.6% |

Thus, although this puts more light into the positive first order diffraction image B at the expense of transmission at zero order, it also puts more into the negative first order diffraction image B'.

In order to transfer energy from B' to B it is necessary to have within each zone an asymmetrical action on the phase delay of the light. In accordance with the invention, therefore, an asymmetric retardation of light across the zone width is provided such that light is predominantly directed into the positive first order diffraction wavefront (B) at the expense of transmission at negative first order diffraction (B'). One approach to this is to divide each zone into three equal areas (rather than the two of FIG. 5) and arrange a staircase effect on the phase of the light. The phase difference between these steps within each zone must now be equivalent to $\lambda/3$ where $\lambda$ is the wavelength of light.

The action of this is shown in FIG. 6 which is a cross-sectional illustration similar to FIGS. 4 and 5. The wavefront formations are too complex to draw but the resulting intensities into each image may be calculated by the formula:

$$I_n = \left(\frac{\sin\pi(n - 1 + \frac{1}{3})}{\pi(n - 1 + \frac{1}{3})}\right)^2$$

This gives the following results:

| | | | | Order | | | | | | | |
|---|---|---|---|---|---|---|---|---|---|---|---|
| | −5 | −4 | −3 | −2 | −1 | 0 | 1 | 2 | 3 | 4 | 5 | 6 |
| Designation | F' | E' | D' | C' | B' | A | B | C | D | E | F | G |
| Intensity | 5% | 0 | 0 | 17% | 0 | 0 | 68% | 0 | 0 | 4% | 0 | 0 |
| n | −1 | | | 0 | | | +1 | | | +2 | | |

If the zones are each divided into four areas (instead of the three in FIG. 6) while retaining the staircase action, the $\frac{1}{3}$ value in the above formula is changed to $\frac{1}{4}$, so that:

$$I_n = \left(\frac{\sin\pi(n - 1 + \frac{1}{4})}{\pi(n - 1 + \frac{1}{4})}\right)^2$$

which gives

| | | | | Order | | | | | | | |
|---|---|---|---|---|---|---|---|---|---|---|---|
| | −5 | −4 | −3 | −2 | −1 | 0 | 1 | 2 | 3 | 4 | 5 | 6 |
| Designation | F' | E' | D' | C' | B' | A | B | C | D | E | F | G |
| Intensity | 0 | 0 | 9% | 0 | 0 | 0 | 81% | 0 | 0 | 0 | 3% | 0 |
| n | | | 0 | | | | 1 | | | | 2 | |

The phase difference between these steps within each zone is now equivalent to λ/4 where λ is the wavelength of light.

It can be seen that the action of increasing the number of steps in the staircase of phase delay over each zone width is to direct more and more of the light available into the positive 1st order diffraction image. The ultimate is reached when the staircase becomes a smooth curve. Because each zone was divided into equal areas (giving equal intensity and amplitude) to form the staircase, the width of each respective area decreases from the inner edge of each zone to the outer edge. However, the step rise is the same in each case. Accordingly, as more and more steps are introduced the overall shape or contour becomes a curve and not a straight line. FIG. 7 shows the transition from six stepped areas to a continuous line. In this latter case it can be seen that the total change in phase at the edge of the zone is λ where λ is the wavelength of light.

The preceding explanation refers simply to the wavelength of light but the wavelength of visible light is not a single value. The human eye can see a range of wavelengths which it describes as colour, and the spectrum of colours changes from blue through green and yellow to red. The wavelength of blue light is about 400 nanometers (0.4 micrometers) and that of red light about 700 nanometers (0.7 micrometers). Although it is possible to design a diffractive lens to have the values tabled above, these will only apply for a single wavelength of light. This single wavelength (usually called the design wavelength) may be any value in or near the visible range indicated but it will be found that light of other wavelengths will form images at different foci and different intensities.

If a design wavelength of 400 nanometers is assumed, then the proportions of light at wavelengths over the visible spectrum which go into the different images are indicated in FIG. 8, in which the top graph represents the equi-transparent/opaque areas case (FIG. 4), the second graph the two stepped transparent areas case (FIG. 5), the third graph the three stepped transparent areas case (FIG. 6), and the bottom graph the continuous line (smooth curve) case (FIG. 7). From these graphs it is seen that with the exception of the equi-transparent/opaque zone plate design all the systems show a reduction in the intensity of the first order diffraction B image as wavelengths different from the design wavelength are considered. Most of this loss appears as an increase in intensity for the zero order transmission A image which has infinite focal length. Thus light of a wavelength displaced from the design wavelength is predominantly transmitted at zero order in preference to positive first order diffraction. The physical reason for this change with wavelength is that the material added (in FIG. 5 for example) provides the "correct" delay to the light only for a particular wavelength. Although its refractive index changes with wavelength, this is only a small change. The delay is given by the product of index difference and thickness *as a proportion of the wavelength*. Thus, while an index difference of 0.5 and a thickness of 0.8 micrometers gives a delay of 400 nanometers compared to the same thickness of air, which is about one wavelength for Blue light of wavelength 400 nanometers, this same delay is 0.57 wavelengths for Red light of wavelength 700 nanometers.

It is also important to note that the location of each image is different for light of different wavelengths. The formula for the focal length of each order of wavefront contains λ, the wavelength of light, in its denominator. Thus, as the wavelength is increased (going towards Red light) the focal length is shortened. However, the eye also has a change in its focal length with wavelength. The value of the effect in the eye is in the opposite sense to that with a diffractive lens of positive power. Accordingly, for the first order diffraction B image with a required focal length of 500 mm (2 dioptres) at the design wavelength of 400 nanometers, the focal length for Red light of 700 nm is only 285 mm (3.5D). However, this change of 1.5D is virtually nullified by the eye having a change over the same wavelength difference of −1.0D.

It will thus be seen that a contact lens with a phase zone-plate having three or more stepped areas, or a corresponding smooth curve, across each zone width, can provide an add of +2 dioptres or thereabouts where the light in the add is predominantly Blue while the refractive power (if any) of the contact lens can correct any ametropia to give distance vision predominantly in the Red. Hence, blue light from a near object can be focussed by way of positive first order diffraction and red light from a far object can be focussed by way of zero order transmission.

Returning now to the contours shown in profile in FIGS. 6 and 7, it should be recognised that these are shown as drawn on flat substrates, whereas the surfaces of a contact lens are curved. A typical rear surface curve of 8 mm radius has been indicated. The required surface contour can be superimposed on the base curve in a manner which effectively retains the basic curvature. Although there is no change in curvature when surface layers are added, it will be appreciated that the extra thickness can be considered either as changing the centre of curvature but keeping the same radius or as very slightly shortening the radius of curvature. FIG. 9, in which 't' indicates the extra thickness for the stepped areas (or corresponding smooth curve) and R1 and R2 respective radii of curvature, shows the difference.

If the extra thickness is formed by thin-film deposition of extra layers where the molecules of the film material are shot at the curve from a long distance, then the upper representation of FIG. 9 is the more exact. However, if the extra thickness is imparted during the making of the whole surface (e.g. using single-point diamond turning) then either representation may be valid or even a mixture of the two. Because the thickness changes (2 or 3μ microns) are very small compared to the basic radius of curvature (8 mm, which is 8000 microns) there is no appreciable difference in their effect. However, the alternatives may generate some confusion when defining the smooth curves in the ultimate case of FIG. 7. When the exact curved profile is added to the base curve of 8 mm radius, it is found that a new curvature is generated. In the case of the rear surface of a contact lens the material forming the profile is likely to have a refractive index of 1.48 while the tear fluid filling the troughs of the profile is of refractive index 1.33. Thus Δn, the difference in refractive index, is 0.15. Hence the rear surface of the contact lens has an optical power given by $$\frac{-\Delta n}{r}$$

dioptres (where r is the radius of curvature in meters) which calculates to be $$\frac{-0.15}{8 \times 10^{-3}} = -18.75 \text{ dioptres.}$$

It can be calculated what radius of curvature would be needed to change this to −16.75 dioptres, as such a change would provide a reading add of 2 dioptres. This value is nearly 9 mm. On the other hand if the effect is calculated of adding the profile of FIG. 7 to the 8 mm radius base curve, the new surface is found also to be a curve of radius nearly 9 mm. The difference in the phase zone plate concept is that this new curvature only extends as far as the boundary of the first full-wave zone. At that point a sharp change is allowed in the surface location equivalent to a phase delay of one wavelength at the design wavelength chosen. It is found by calculation that this is the same step size as brings the surface back to the 8 mm radius curve. The profile of the second zone starts at this point and this too give a radius of curvature of nearly 9 mm. Again, this proceeds outwards until the boundary of the second zone. At this point it is one wavelength step size away from the 8 mm radius base curve. Thus the series of zones each having a radius of curvature of 9 mm is set on a curvature of radius 8 mm traced out by the edges of the zones. This 8 mm radius curve is also traced out by the lower edges of each step. The two 8 mm radius curves are in fact one step size apart.

The arrangement is illustrated in FIG. 10 which shows part of the rear surface of a bifocal contact lens comprising a plurality of concentric zones of the same size as in a phase zone plate, the zones being defined by steps 4 between smooth curved zone areas 5 of 9 mm radius of curvature, the step size being such that the step top edges lie on a curve of 8 mm radius of curvature and the step bottom edges lie on another curve of 8 mm radius of curvature. In FIG. 10, which is not to scale, the step sizes are magnified more than the zone sizes in order to exaggerate the effect.

In the case of zones with stepped areas as shown in FIG. 6, the 8 mm radius of curvature value is not changed, but the location of this surface is shifted at each step and returned at the end of each zone. FIG. 11 shows part of the rear surface of a bifocal contact lens comprising a plurality of concentric zones of the same size as in a phase zone plate, the zones being defined by steps 6 and each zone having three stepped areas 7, 8 and 9 of 8 mm radius of curvature, the step sizes being such as to give general conformation to a base curve of 8 mm radius of curvature. Like FIG. 10, FIG. 11 is not to scale. The only curvature which exists in this arrangement is the 8 mm radius, but because this is stepped back at each ⅓ zone the surface within each zone approximates to the 9 mm surface required for the add value.

Thus in both these arrangements a curvature of one radius is made discontinuous so that it approximates to another curvature of different radius, even though the other curvature does not exist at any one place. A convenient analogy is that of a tiled roof where each individual tile slopes at a given angle but the slope (or pitch) of the whole roof is at a different angle. By such discontinuous arrangement a lens incorporating a phase zone plate can effectively achieve two curvatures (and therefore two focal lengths and focal powers) from one general surface.

The manufacture of such surfaces can utilise thin-film deposition methods, particularly when this can be applied to a mould from which many lenses may be cast or moulded. A further method of manufacture is the direct cutting of the surface using a high precision lathe. The cutting point is often a single point diamond and surfaces of good optical quality can be achieved. Such lathes have computer control systems which can position the cutting diamond to within one micron and can return centre of rotation of the diamond-carrying arm to the same position within ±0.2 microns. From FIG. 10 it can be seen that a lathe set up to turn a radius of 9 mm could be shifted at each zone edge by the one wavelength delay step size and continue cutting the 9 mm radius until the second zone edge, etc. Alternatively, a lathe set up to cut 8 mm radius could be used to cut such a curve across the whole lens and then return to cut the same radius but at slightly lower depths at the positions marked as 8 and 9 on FIG. 11.

From the foregoing it will be seen that the resultant lens surface is a smooth curve interrupted in a regular series of discrete steps of related size. The curvature of the smooth curve determines one focus of the bifocal action while the regular series of steps determines the other focus of the bifocal action. The proportion of the available light which goes into these foci is determined by the sizes of the steps.

It will be appreciated that any of the zones or steps within each zone may be shifted by an amount equal to one wavelength (or multiples of one wavelength) delay at the design wavelength. The purpose of this is to affect the rate of change-over of intensity between the two images as the wavelength of the incident light is changed. Thus, for example, the second zone may be raised by one wavelength and also the third or fourth zones. The performance of the phase zone plate at the design wavelength is impervious to shifts of one (or multiples of one) wavelength.

As specifically described above the diffractive power is given by a series of circular hills (or valleys) on the contact lens rear surface, i.e. a surface relief hologram. It will be appreciated that a surface relief hologram could instead be on the front surface of the contact lens. It will further be appreciated that the diffractive power could be provided by refractive index changes instead of surface relief or thickness changes, or by a combination of refractive index and thickness changes. In each case the changes should be such as to provide the required asymmetric retardation of light across each zone width. Yet further, although the contact lens is described above as having refractive power resulting from the material of the lens and the basic curvature of its surfaces, the contact lens could have zero refractive power so that its optical power is wholly diffractive. Still further, although the order of diffraction into one sign (described above as positive) of which light of the design wavelength is predominantly directed is preferably, as described above, the first order, some other order could be employed with the lens appropriately designed predominantly to direct light of the design wavelength into one sign of that other order of diffraction. The design wavelength of 400 nanometers (blue light) mentioned above is a particularly suitable design wavelength being well displaced from the 700 nanometers wavelength (red light) which is predominantly transmitted at zero order, but is of course given by way of example and some other design wavelength could be used.

I claim:

1. A bifocal contact lens dividing light passing through a common portion thereof and providing two foci for said light, a first portion of said light being focused by refraction and a second portion of said light being focused by asymmetric zone plate surfaces.

2. A bifocal contact lens which determines one focus of the bifocal action by refraction and the other focus of the bifocal action by diffraction, the lens substantially having a basic curvature which conforms to the said one focus but comprising concentric zones formed on said basic curvature, said zones having surfaces spaced from said basic curvature by distances differing across each zone width.

3. A bifocal contact lens having one focus provided by diffraction and the other focus provided by refraction comprising a lens surface having steps defining a plurality of concentric zones of the same size as in a phase zone plate, said lens surface being made up of discrete parts having a curvature of the same one radius but with steps between said parts of a size such that a series of parts together provide a discontinuous surface approximating to a curvature of a radius different from said one radius, one of said curvatures providing a retardation of light across each zone width which determines said focus provided by diffraction and the other of said curvatures determining said focus provided by refraction.

4. A bifocal contact lens having a basic curvature which determines one focus of the bifocal action and having diffractive power which determines the other focus of the bifocal action, the lens comprising a plurality of concentric zones which together conform to the basic curvature providing the said on focus but which are arranged so as to cause diffraction of light transmitted through the lens with each zone providing an asymmetric retardation of light across the zone width in a manner which directs light of a design wavelength predominantly into one required order and sign of diffraction at the expense of transmission at zero order and at the expense of transmission at the opposite sign of said required order of diffraction, while light of another wavelength displaced from said design wavelength is predominantly transmitted at zero order in preference to the said required order and sign of diffraction, whereby light of said design wavelength is directed to the other focus by way of said required order and sign of diffraction and light of said other wavelength is directed to the said one focus by way of zero order transmission and refraction.

5. A lens according to claim 4 in which said required order of diffraction is first order diffraction.

6. A lens according to claim 4 in which the zones are defined, and the asymmetric retardation is provided, by the surface contour of the lens.

7. A lens according to claim 6 in which the zones are defined, and the asymmetric retardation is provided, by the rear surface contour of the lens.

8. A lens according to claim 4 in which the zones are defined by steps in the lens surface.

9. A lens according to claim 4 in which the asymmetric retardation is provided by a stepped surface contour having stepped areas across each zone.

10. A lens according to claim 8 in which the asymmetric retardation is provided by a stepped surface contour having stepped areas across each zone.

11. A lens according to claim 4 in which the asymmetric retardation is provided by a smooth curve across each zone.

12. A lens according to claim 8 in which the asymmetric retardation is provided by a smooth curve across each zone.

13. A lens according to claim 4 whose diffractive power is additional to refractive power provided by the material of the lens and the basic curvature of its front and rear surfaces.

14. A lens according to claim 13 having a surface contour superimposed on the base curve in a manner which effectively retains the basic curvature.

15. A lens according to claim 14 in which the asymmetric retardation is provided by a stepped surface contour having stepped areas across each zone.

16. A lens according to claim 15 in which the stepped areas across each zone each have a radius of curvature the same as that of the base curve.

17. A lens according to claim 14 in which the zones are defined by steps in the lens surface and the asymmetric retardation is provided by a smooth curve across each zone.

18. A lens according to claim 17 in which the smooth curve across each zone has a radius of curvature which differs from that of the base curve but the step size at the zone edge is such as to give general conformation of the surface to the basic curvature.

19. A lens according to claim 4 having a surface contour produced by cutting.

20. A lens according to claim 19 having a surface contour cut by a computer-controlled lathe.

21. A lens according to claim 6 having a surface contour produced by cutting.

22. A lens according to claim 21 having a surface contour cut by a computer-controlled lathe.

* * * * *